(12) United States Patent
Chen et al.

(10) Patent No.: US 7,844,213 B2
(45) Date of Patent: Nov. 30, 2010

(54) REDUCING SPECTRAL ROLL-OFF FACTORS TO INCREASE SPECTRAL EFFICIENCY

(75) Inventors: Ernest C. Chen, San Pedro, CA (US); Joseph Santoru, Agoura Hills, CA (US); Shamik Maitra, Redondo Beach, CA (US); Dennis Lai, Cerritos, CA (US); Tung-Sheng Lin, Claremont, CA (US); Guangcai Zhou, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 554 days.

(21) Appl. No.: 11/831,821

(22) Filed: Jul. 31, 2007

(65) Prior Publication Data

US 2009/0036086 A1 Feb. 5, 2009

(51) Int. Cl.
*H04H 1/00* (2006.01)
(52) U.S. Cl. .................. 455/3.02; 455/307; 455/306; 455/339; 455/340
(58) Field of Classification Search ............... 455/296, 455/286, 306, 307, 308, 317, 334, 339, 340, 455/50.1, 3.02, 3.06, 182.1, 182.2; 375/279, 375/308, 240.1, 240.01, 295, 222, 261, 337, 375/458, 298; 725/63, 78, 54, 148, 118, 725/119, 74, 80
See application file for complete search history.

(56) References Cited

U.S. PATENT DOCUMENTS

| | | | |
|---|---|---|---|
| 4,583,235 A | 4/1986 | Domer et al. | |
| 4,594,607 A * | 6/1986 | Lewis et al. | 348/639 |
| 4,667,240 A * | 5/1987 | Willis et al. | 348/620 |
| 5,151,926 A | 9/1992 | Chennakeshu et al. | |
| 5,202,901 A | 4/1993 | Chennakeshu et al. | |
| 5,283,815 A | 2/1994 | Chennakeshu et al. | |
| 5,309,235 A | 5/1994 | Naimpally | |
| 5,648,988 A | 7/1997 | Iwamatsu et al. | |
| 5,703,910 A | 12/1997 | Durvaux et al. | |
| RE37,326 E * | 8/2001 | Kim | 348/725 |
| 6,396,885 B1 | 5/2002 | Ding et al. | |
| 6,667,760 B1 | 12/2003 | Limberg | |
| 6,771,699 B1 | 8/2004 | Karaoquz et al. | |
| 7,729,410 B2 * | 6/2010 | Eidson | 375/146 |
| 2002/0106018 A1 * | 8/2002 | D'Luna et al. | 375/240.01 |
| 2003/0016761 A1 * | 1/2003 | Min | 375/298 |
| 2004/0047430 A1 * | 3/2004 | McCarty, Jr. | 375/295 |
| 2005/0047497 A1 * | 3/2005 | Rubinstain et al. | 375/222 |
| 2005/0060749 A1 * | 3/2005 | Hong et al. | 725/78 |

(Continued)

FOREIGN PATENT DOCUMENTS

JP 07193605 A 7/1995

(Continued)

*Primary Examiner*—Tan Trinh

(57) ABSTRACT

Systems for delivering a plurality of broadcast programs where the transmitter and receiver roll-off factors are mismatched. A system in accordance with the present invention comprises a transmitter comprising a modulator, and a plurality of receivers, each receiver in the plurality of receivers receiving the plurality of broadcast programs, each receiver in the plurality of receivers further comprising a demodulator; wherein the modulator has a first root-raised cosine filter having a first roll-off factor and each receiver has a second root-raised cosine filter having a second roll-off factor, the first roll-off factor being smaller than the second roll-off factor.

10 Claims, 2 Drawing Sheets

U.S. PATENT DOCUMENTS

| | | | |
|---|---|---|---|
| 2005/0186933 A1* | 8/2005 | Trans | 455/296 |
| 2006/0209982 A1* | 9/2006 | De Gaudenzi et al. | 375/279 |
| 2007/0165578 A1* | 7/2007 | Yee et al. | 370/337 |
| 2007/0189366 A1* | 8/2007 | Ryu et al. | 375/148 |
| 2008/0060021 A1* | 3/2008 | Basse et al. | 725/63 |
| 2008/0186088 A1* | 8/2008 | Eidson | 329/304 |

FOREIGN PATENT DOCUMENTS

JP         2004201267 A         7/2004

* cited by examiner

REDUCING SPECTRAL ROLL-OFF FACTORS TO INCREASE SPECTRAL EFFICIENCY

BACKGROUND OF THE INVENTION

1. Field of the Invention

The present invention relates generally to a satellite broadcast system, and in particular, to a modulator for such a satellite broadcast system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight Integrated Receiver & Decoders (IRDs) on separate cables from a multiswitch.

FIG. 1 illustrates a typical satellite television broadcast system of the related art.

System 100 uses signals sent from Satellite A (SatA) 102, Satellite B (SatB) 104, and Satellite C (SatC) 106 (with transponders 28, 30, and 32 converted to transponders 8, 10, and 12, respectively), that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different sets of frequencies, often referred to as transponders, which are licensed to various users for broadcasting of programming, which can be audio, video, or data signals, or any combination. These signals have typically been located in the Ku-band Fixed Satellite Service (FSS) and Broadcast Satellite Service (BSS) bands of frequencies in the 10-13 GHz range. Future satellites will likely also broadcast in a portion of the Ka-band with frequencies of 18-21 GHz The downlink signals 120 frequency allocations are fixed in size and, thus, the bandwidth for transmission in those frequency bands limit the ability of the system 100 to transmit additional signals using the current transmission and receiving method. With additional satellites and additional channels, more signals must be transmitted within that bandwidth to allow for additional programming within system 100. Further, signals 120 can be sent to IRD 112 via cable 122 rather than or in addition to the use of satellites 102-106.

It can be seen, then, that there is a need in the art for a satellite broadcast system to increase the spectral efficiency with the allocated bandwidth.

SUMMARY OF THE INVENTION

To minimize the limitations in the prior art, and to minimize other limitations that will become apparent upon reading and understanding the present specification, the present invention discloses systems for delivering a plurality of broadcast programs where the transmitter and roll-off factors are mismatched. A system in accordance with the present invention comprises a transmitter comprising a modulator, and a plurality of receivers (IRDs), each receiver in the plurality of receivers receiving the plurality of broadcast programs, each receiver in the plurality of receivers further comprising a demodulator; wherein the modulator has a first root-raised cosine filter having a first roll-off factor and each receiver has a second root-raised cosine filter having a second roll-off factor, the first roll-off factor being smaller than the second roll-off factor.

Such a system further optionally includes the first and second roll-off factors being selectable, the second roll-off factor being selected from a group consisting of 0.2, 0.25, and 0.35, and the first roll off factor being selected from a group consisting of the set of the second roll off factors plus other smaller values, for example values of 0.1 and 0.15.

Another system in accordance with the present invention comprises a transmitter comprising a modulator, the modulator having a first roll-off factor, and a plurality of receivers, each receiver in the plurality of receivers receiving the plurality of broadcast programs, each receiver in the plurality of receivers further comprising a demodulator having a second roll-off factor, the first roll-off factor being smaller than the second roll-off factor. It is assumed that the modulator and the receiver can operate at a desired higher symbol rate than the current symbol rate. Such a system further optionally includes the first and second roll-off factors being selectable, the second roll-off factor being selected from a group consisting of 0.2, 0.25, and 0.35, and the first roll off factor being selected from a group consisting of the set of the second roll off factors plus other smaller values, for example, 0.1 and 0.15.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

The present invention uses a transmitter in a communications system that uses a signal roll-off factor that is smaller than that for the receiver. This reduces the occupied bandwidth of the transmitted signal, and can therefore increase the total throughput available by increasing the symbol rate of the signals or by increasing the number of carriers over the allocated system bandwidth.

Such an approach significantly increases the spectral efficiency of a system that already has deployed receivers that would be costly or difficult to replace. Further, such an approach minimizes the hardware and other costs needed to support a change in the signal roll-off factor, as well as minimizing associated system performance degradations.

Particulars of the Present Invention

Figure 1:
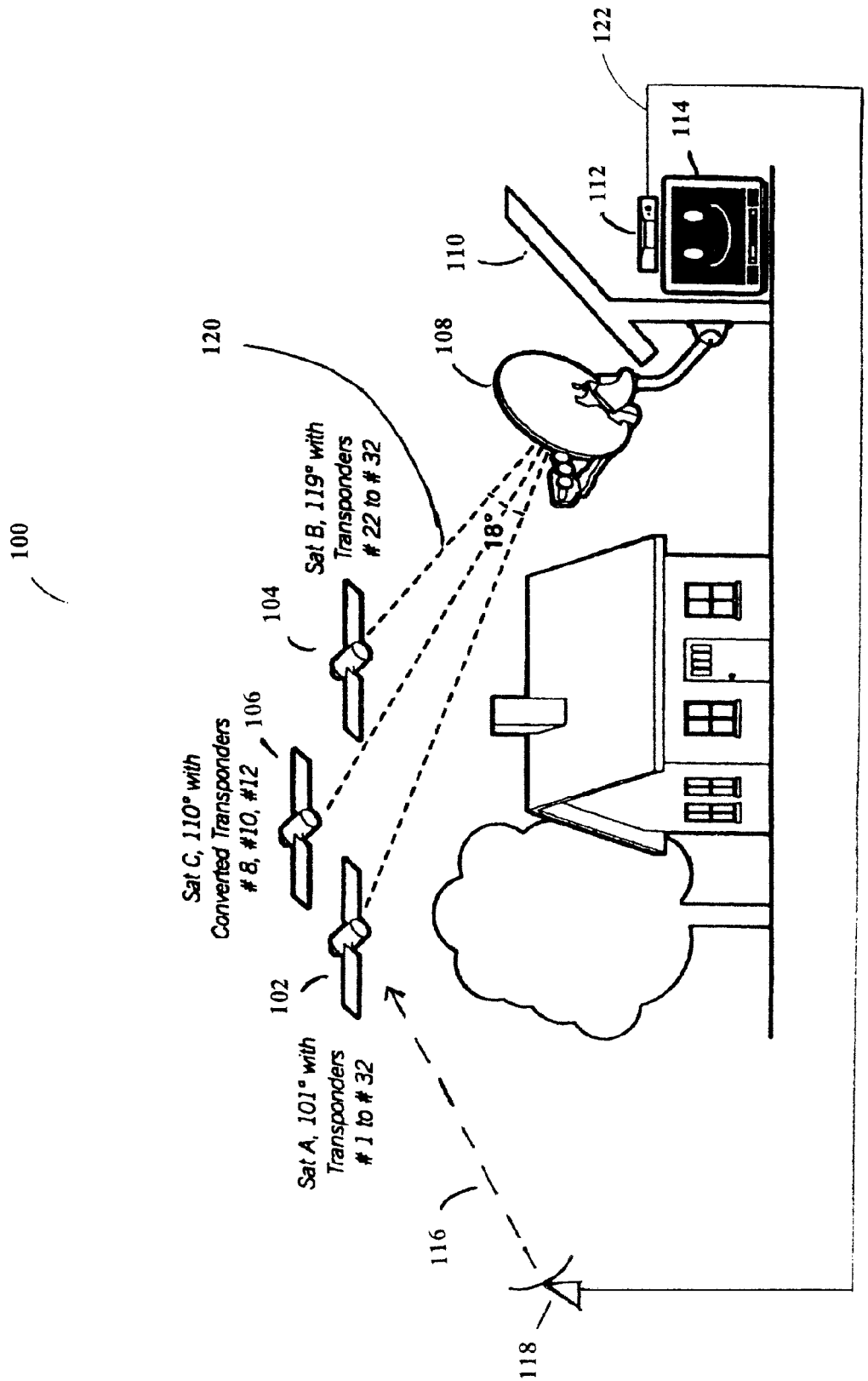
FIG. 1 illustrates a typical satellite television broadcast system of the related art.
Figure 2:
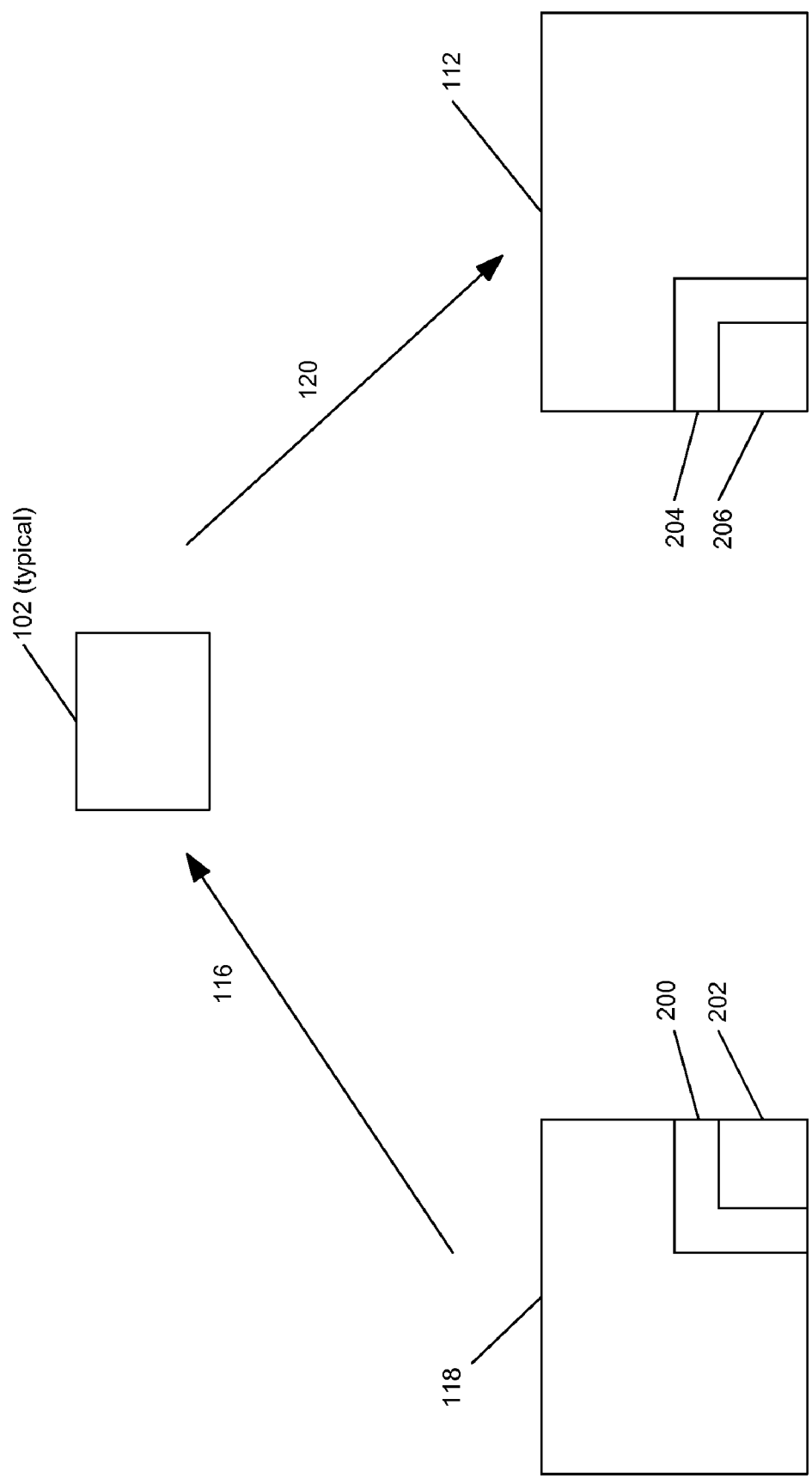
FIG. 2 illustrates a communications link in accordance with the present invention.

FIG. 2 illustrates a communications link in accordance with the present invention.

Transmitter 118 comprises, among other things, a modulator 200, and, within modulator 200, a portion 202 of the modulator 200 that comprises a roll-off factor. The modulator 200 generally uses a Root Raised Cosine Filter (RRCF) for portion 202, and the roll-off factor is typically referred to as roll-off factor $\alpha$. Portion 202 can be other types of filters or other devices that comprise a general roll-off factor for transmission of signals 116 without departing from the scope of the present invention.

On the receiver 112 side, receiver 112 comprises, among other things, a demodulator 204 with a portion 206 of demodulator 204 that comprises a roll-off factor. Typically, the demodulator 204 also uses a RRCF for portion 206, with the same $\alpha$ as that used in portion 202. Portion 206 can be other types of filters or other devices that comprise a roll-off factor for transmission of signals 116 without departing from the scope of the present invention.

The present invention allows the roll-off factor used in portion 202 to be different, and typically smaller, than the roll-off factor used in portion 206.

This matched-filter approach maximizes the Carrier to Noise Ratio (CNR) in the receiver 112. A transmitter $\alpha$ results in an occupied signal bandwidth which is (1+$\alpha$) times the symbol rate. Therefore, an allocated signal bandwidth can support a higher symbol rate, or higher throughput, by approximately 9% for $\alpha$=0.1 versus $\alpha$=0.2 as an example. The receiver $\alpha$ cannot affect the transmitted signal bandwidth, but a receiver $\alpha$ mismatched to the transmitter $\alpha$ can impact the receiver 112 performance.

Although a larger roll-off factor takes up a wider signal bandwidth, it reduces Inter-Symbol Interference (ISI) for a given amount of signal mismatch. On the other hand, a smaller transmitter roll-off factor uses less signal bandwidth but requires a more accurate (and therefore longer) matched filter that takes up more memory and processing power in the receiver. Because of these considerations, the receiver is usually built with a fixed set of roll-off $\alpha$ factors. For example, typical demodulator 204 and decoder chips provide roll-off factors of $\alpha$=0.2, 0.25, and 0.35. These chips are not modifiable in the field to add new roll-off factors, or change the existing set of roll-off factors $\alpha$.

As mentioned, conventional systems use the same roll-off factor $\alpha$ for both the modulator 200 and the demodulator 204. Bandwidth savings is realized by reducing the roll-off factor in the modulator 200, despite the ISI issues that arise. When the two roll-off factors $\alpha$ are different, the output power of the processed signal will be reduced and an additional amount of ISI will be produced with a level determined by the mismatch factor. The reduced C power and increased effective noise power N (to N+ISI) results in a CNR degradation.

Such CNR degradations are minimal even for seemingly large mismatches. For example, if the $\alpha$ factor for the modulator is 0.1 and the $\alpha$ factor for the demodulator is 0.2, a signal with a QPSK format and a code rate ¾ operating at the threshold CNR of 4.2 dB will only have a 0.0468 dB of CNR degradation, and a signal with an 8PSK format and a code rate ⅔ operating at the threshold CNR of 6.9 dB will only have a 0.0488 dB of CNR degradation. Computer simulations also show that the additional CNR degradation from timing recovery errors due to a factor mismatch is small (on the order of 0.02 dB for Advance Modulation and Coding (AMC) modes at their operating thresholds). Thus, the CNR impact can be minimum for a mismatch between $\alpha$=0.1 and $\alpha$=0.2. The smaller transmitter $\alpha$ reduces occupied signal bandwidth for a given symbol rate. The recovered signal bandwidth may be used to increase the throughput by using a higher symbol rate or by squeezing in new carriers. This means an increase in spectral efficiency with minimum implementation cost and system degradation.

The receivers in the field outnumber the modulators by a large factor. For example, there might be 20 million IRDs 112 installed, but only a few hundred modulators needed to serve them. The demodulator in the IRD most often relies on an application-specific integrated circuit (ASIC) with fixed $\alpha$ factors. Therefore, it would be very costly to enable the IRDs with a smaller $\alpha$ factor if it is not currently available in the chip. On the other hand, the modulators are typically implemented with a Field Programmable Gate Array (FPGA) that can be reprogrammed to include a new roll-off factor $\alpha$ such as 0.1. Since it is shown in the present invention that changing the modulator roll-off factor $\alpha$ reduces the signal bandwidth with little CNR degradation, modifying the modulators by software alone is a cost effective way to realize the increased bandwidth efficiency. Typically, the demodulators in the IRDs are a value of 0.1, 0.15, and 0.2, but can be other values without departing from the scope of the present invention. The modulators typically have values of 0.2, 0.25, and 0.35, but can have other values without departing from the scope of the present invention.

CONCLUSION

In summary, the present invention comprises systems for delivering a plurality of broadcast programs. A system in accordance with the present invention comprises a transmitter comprising a modulator, and a plurality of receivers, each receiver in the plurality of receivers receiving the plurality of broadcast programs, each receiver in the plurality of receivers further comprising a demodulator; wherein the modulator has a first root-raised cosine filter having a first roll-off factor and each receiver has a second root-raised cosine filter having a second roll-off factor, the first roll-off factor being smaller than the second roll-off factor.

Such a system further optionally includes the first and second roll-off factors being selectable, the second roll-off factor being selected from a group consisting of 0.2, 0.25, and 0.35, and the first roll off factor being selected from a group consisting of the set of the second roll off factors plus other smaller values, for example values of 0.1 and 0.15.

Another system in accordance with the present invention comprises a transmitter comprising a modulator, the modulator having a first roll-off factor, and a plurality of receivers, each receiver in the plurality of receivers receiving the plurality of broadcast programs, each receiver in the plurality of receivers further comprising a demodulator having a second roll-off factor, the first roll-off factor being smaller than the second roll-off factor.

Such a system further optionally includes the first and second roll-off factors being selectable, the second roll-off factor being selected from a group consisting of 0.2, 0.25, and 0.35, and the first roll off factor being selected from a group consisting of 0.1 and 0.2.

It is intended that the scope of the invention be limited not by this detailed description, but rather by the claims appended hereto and the equivalents thereof. The above specification, examples and data provide a complete description of the manufacture and use of the composition of the invention.

Since many embodiments of the invention can be made without departing from the spirit and scope of the invention, the invention resides in the claims hereinafter appended and the equivalents thereof.

What is claimed is:

1. A communications system for delivering a plurality of broadcast programs, comprising:
   a transmitter comprising a modulator; and
   a plurality of receivers, each receiver in the plurality of receivers receiving the plurality of broadcast programs, each receiver in the plurality of receivers further comprising a demodulator; wherein the modulator has a first root-raised cosine filter having a first roll-off factor and each receiver has a second root-raised cosine filter having a second roll-off factor, the first roll-off factor being smaller than the second roll-off factor.

2. The communications system of claim 1, wherein the second roll-off factor is selectable.

3. The communications system of claim 2, wherein the first roll-off factor is selectable.

4. The communications system of claim 3, wherein the second roll-off factor is selected from a group consisting of 0.2, 0.25, and 0.35.

5. The communications system of claim 4, wherein the first roll off factor is selected from a group consisting of 0.1 and 0.2.

6. A communications system for delivering a plurality of broadcast programs, comprising:
   a transmitter comprising a modulator, the modulator having a first roll-off factor; and
   a plurality of receivers, each receiver in the plurality of receivers receiving the plurality of broadcast programs, each receiver in the plurality of receivers further comprising a demodulator having a second roll-off factor, the first roll-off factor being smaller than the second roll-off factor.

7. The communications system of claim 6, wherein the second roll-off factor is selectable.

8. The communications system of claim 7, wherein the first roll-off factor is selectable.

9. The communications system of claim 8, wherein the second roll-off factor is selected from a group consisting of 0.2, 0.25, and 0.35.

10. The communications system of claim 9, wherein the first roll off factor is selected from a group consisting of 0.1 and 0.2.

* * * * *